2,995,580
PROCESS FOR PRODUCING PHENYL SUCCINIC ANHYDRIDE

Charles A. Miller, Detroit, Mich., assignor to Parke, Davis & Company, Detroit, Mich., a corporation of Michigan
No Drawing. Filed May 2, 1955, Ser. No. 505,513
2 Claims. (Cl. 260—346.8)

This invention relates to a process for producing phenylsuccinic anhydride.

At the present time phenylsuccinic anhydride is prepared by reacting cyanoacetic acid with benzaldehyde, esterifying the $\alpha$-cyano-$\beta$-phenylacrylic acid so obtained, reacting the ester with sodium cyanide to produce ethyl $\alpha,\beta$-dicyano-$\beta$-phenyl propionate, subjecting this latter substance to hydrolysis to obtain phenylsuccinic acid and cyclizing the phenylsuccinic acid by the action of acetic anhydride or acetyl chloride. Another method for producing this substance involves reacting benzaldehyde with malonic ester to produce diethyl benzalmalonate which is then reacted with potassium cyanide to yield ethyl-$\beta$-phenyl-$\beta$-cyanopropionate, hydrolyzing the latter substance to phenylsuccinic acid and cyclizing the phenylsuccinic acid by the action of acetic anhydride or acetyl chloride. Other similarly complicated procedures have been proposed for the production of this substance. For representative references to the prior art, see Journal of the Chemical Society, 121, 2741 (1922) and Journal of the American Chemical Society 62, 2450 (1940). All of the known methods suffer the disadvantage that they are either very complicated to carry out, involve the use of expensive starting materials and/or give poor yields and as a result phenylsuccinic anhydride is quite an expensive chemical.

It is an object of the present invention ot provide a simple process for producing phenylsuccinic anhydride from readily available starting materials in high yields.

In accordance with the invention this object is realized by subjecting phenylmaleic anhydride to the action of gaseous hydrogen in the presence of a hydrogenation catalyst. As hydrogenation catalysts, Raney nickel and the noble metal catalysts such as palladium and platinum oxide give particularly good results. The temperature and the hydrogen pressures used in carrying out the process are not particularly critical. Temperatures between 15 and 125° C. are satisfactory and hydrogen pressures varying from one atmosphere to a hundred or more can be used. There is no need to use extremely high temperatures and pressures since excellent results are obtained using temperatures between 20 and 50° C. and pressures between 2½ to 6 atmospheres. As solvents for the reaction inert organic solvents such as esters of lower fatty acids like ethyl acetate, low boiling petroleum ether, cyclic ethers like dioxane and tetrahydrofuran, ethers like diethyl ether and the like can be used.

The invention is illustrated by the following examples.

Example 1

500 mg. of 5% palladium on charcoal catalyst is added to 20 g. of phenylmaleic anhydride dissolved in 200 ml. of ethyl acetate. The mixture is shaken with gaseous hydrogen in a closed vessel under a pressure of 49 lbs. per sq. inch and at a temperature of 20 to 30° C. until the theoretical amount of hydrogen has been absorbed. The vessel is vented, the catalyst removed by filtration and the solvent removed from the filtrate by distillation. Distillation of the residue in vacuo yields 17 g. of phenylsuccinic anhydride; B.P. 185–200° C. at 9 mm. The distilled product solidifies and melts at 49–52° C. The yield is 81% of the theoretical.

Example 2

120 mg. of platinum oxide is added to 4 g. of phenylmaleic anhydride in 100 ml. of ethylacetate and the mixture shaken with gaseous hydrogen in a closed vessel under a pressure of 50 lbs. per sq. inch at a temperature of 25° C. until the theoretical amount of hydrogen is absorbed. The vessel is vented, the catalyst removed by filtration and the solvent removed from the filtrate by distillation. Distillation of the residue in vacuo yields the desired phenylsuccinic anhydride; B.P. 185–200° C. at 9 mm. The yield is about 80%.

If desired, the platinum oxide used in the above procedure can be replaced with about 0.4 g. of Raney nickel.

The phenylmaleic anhydride used as a starting material in the practice of the invention is known from Comptes rendus, volume 237, pages 570–572 (1953) and can be prepared cheaply and easily by the interaction of maleic anhydride, benzene and chlorine in the presence of ultraviolet light.

What I claim is:

1. Process for the production of phenylsuccinic anhydride which comprises subjecting a solution of phenylmaleic anhydride in an inert organic solvent of the class consisting of esters of lower fatty acids, di(lower alkyl) ethers, low boiling petroleum ether, dioxane, and tetrahydrofuran at a temperature between 15 and 125° C. to the action of gaseous hydrogen under a pressure of one to one hundred atmospheres in the presence of a platinum oxide hydrogenation catalyst, separating the liquid from the resulting reaction mixture, and treating said liquid to obtain therefrom solid phenylsuccinic anhydride.

2. Process for the production of phenylsuccinic anhydride which comprises dissolving phenylmaleic anhydride in ethyl acetate, adding 5% palladium on charcoal catalyst, shaking the mixture with gaseous hydrogen in a closed vessel under a pressure of about 49 pounds per square inch and a temperature of 20 to 30° C. until the theoretical amount of hydrogen has been absorbed, venting the vessel, separating the liquid from the solid catalyst, distilling the liquid to remove ethyl acetate and obtain a residue, distilling the residue in vacuo to obtain a product having a boiling point 185–200° C. at 9 mm., and cooling the distilled product to obtain solid phenylsuccinic anhydride.

References Cited in the file of this patent

UNITED STATES PATENTS

| | | |
|---|---|---|
| 2,198,153 | Coons | Apr. 23, 1940 |
| 2,245,404 | Kise et al. | June 10, 1941 |
| 2,772,291 | McShane | Nov. 27, 1956 |

FOREIGN PATENTS

| | | |
|---|---|---|
| 441,002 | Germany | Feb. 19, 1927 |

OTHER REFERENCES

Willstatter: Berichte 51, 767–777 (1918).
Ellis: Hydrogenation of Organic Substances, p. 211, D. Van Nostrand and Co., N. Y. 1930 (3rd ed.).